J. L. RANEY.
VEHICLE WHEEL LOCK.
APPLICATION FILED MAR. 2, 1920.
1,376,114.
Patented Apr. 26, 1921.
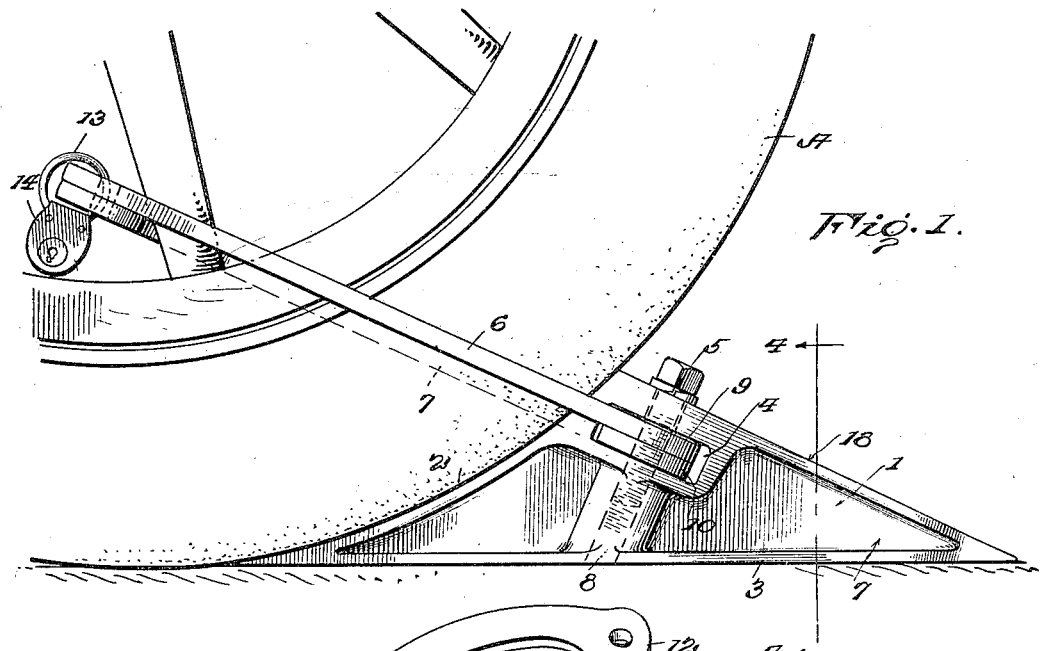
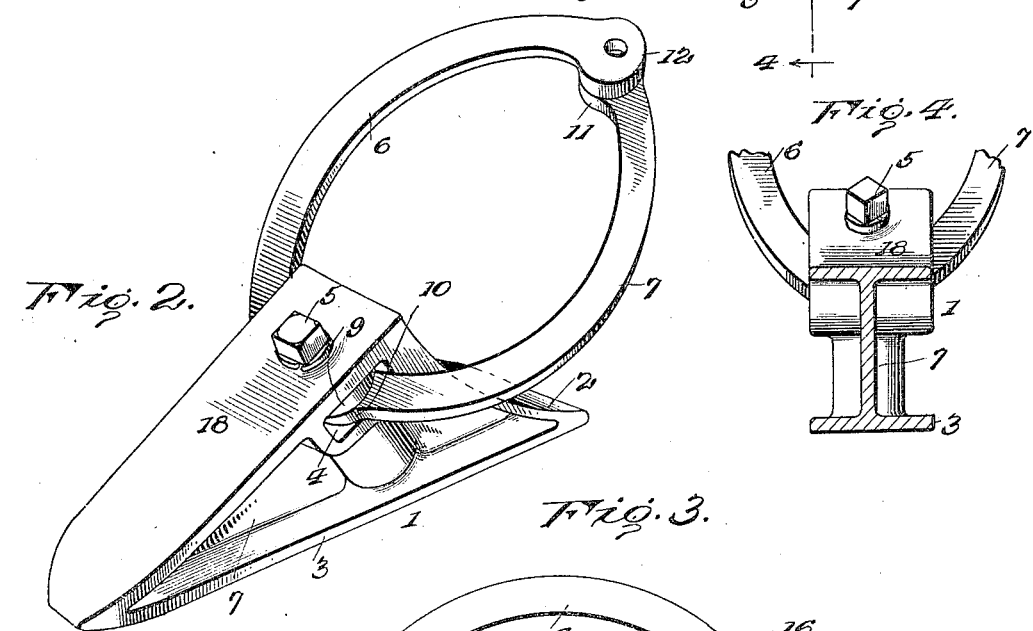
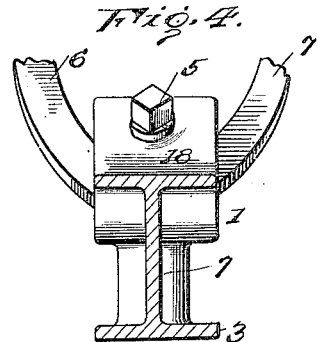
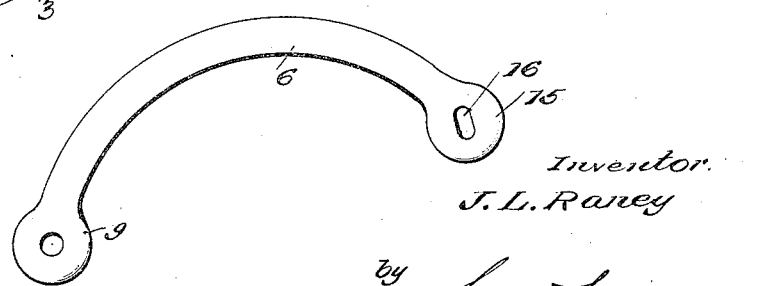
Inventor.
J. L. Raney
by Lacey & Lacey, Att'ys

UNITED STATES PATENT OFFICE.

JAMES LEWIS RANEY, OF CLEVELAND, OHIO.

VEHICLE-WHEEL LOCK.

1,376,114. Specification of Letters Patent. Patented Apr. 26, 1921.

Application filed March 2, 1920. Serial No. 362,796.

*To all whom it may concern:*

Be it known that I, JAMES L. RANEY, a citizen of the United States, residing at Cleveland, in the county of Cuyahoga and State of Ohio, have invented certain new and useful Improvements in Vehicle-Wheel Locks, of which the following is a specification.

This invention relates to a vehicle lock, especially for use with motor vehicles.

It is an object of the invention to provide a lock of this character which is so designed and constructed as to prevent removal after being placed in position and prevent operation of the vehicle in either direction.

A further object of the invention is the provision of a lock which forms a chock under the wheel, thereby preventing the vehicle from being towed or rolled away.

The invention has as an additional object the provision of a chock block of such dimensions as to prevent the same from being moved out of the way with respect to the wheel so that under all circumstances the vehicle is securely locked.

In the drawings:

Figure 1 is a side elevation of the lock as applied to the wheel;

Fig. 2 is a view in perspective of the lock;

Fig. 3 is a top plan view of one of the locking arms;

Fig. 4 is a vertical section on the line 4—4 of Fig. 1.

In detail:

The lock is shown as applied to a motor vehicle wheel A and consists of a chock block 1 having a curved face 2 and a flat face 3 whereby, when the chock is placed in the position shown in Fig. 1 it abuts a wheel tire and prevents the vehicle from rolling. The chock block 1 is cut out laterally as shown at 4 and receives a bolt 5 which projects at right angles to the cut-out 4 and passes through two arms 6 and 7 and is finally headed over in the base of the block as shown at 8 so as to prevent removal. The bolt 5 forms the pivot for the two locking arms 6, 7 which have interfitting bosses 9 and 10 respectively through which the said bolt passes. These arms are of curved form, substantially semi-circular as shown clearly in Figs. 2 and 3 and embrace the tire and felly of the wheel A and have locking bosses 11 and 12 provided with holes through which the hasp 13 of a padlock 14 is passed for locking. When the lock is placed in this position around the tire and felly of the wheel the wheel is prevented from moving in one direction by the chock block 1 and in the other direction if the vehicle is moved the chock block will engage some portion of the vehicle and thereby cause such hindrance to movement of the vehicle that the same cannot be operated. This construction, thereby overcomes the usual difficulty with spike locks for wheels wherein such locks having a spike on one side and a band encircling the wheel may be turned around on the tire if the tire is deflated so that the band engages the road instead of the spike and thus permits successful operation of the vehicle by thieves.

In the form of the locking arm shown in Fig. 3 the locking bosses 15 of the arm may have elongated slots as shown at 16 so that one size of locking arm may be adapted for several sizes of tires.

In carrying the invention into practice it may be found desirable to constitute the major portion of the chock block of a web 17 having the peripheral widened portions 18 forming the surfaces of the block, thus making a light construction and at the same time providing a device which accomplishes all of the purposes intended. This construction is clearly shown in Figs. 1 and 2 and in section in Fig. 4.

I claim:

1. A device for the purpose set forth comprising a substantially triangular block having a flat base to rest upon the ground and having one side curved to present a longitudinally extending wheel-engaging face, and coöperating locking arms pivoted to the block near the apex thereof to embrace a wheel tire and felly to prevent removal of the block, the pivot of said arms being between the vertical sides of the block and intersecting the face of the block extending from the wheel-engaging face.

2. A device for the purpose set forth comprising a substantially triangular block having a flat base to rest upon the ground and having a longitudinally extending convex face to engage a wheel, the block being provided with a chamber opening through its lateral faces, a pivot permanently secured in the block and extending through the said chamber, and wheel-embracing arms mounted upon said pivot.

In testimony whereof I affix my signature.

JAMES LEWIS RANEY. [L. S.]